(12) United States Patent
Raisch

(10) Patent No.: US 6,695,908 B1
(45) Date of Patent: Feb. 24, 2004

(54) METHOD OF PRODUCING AGGREGATE PRODUCTS USING GLASS

(76) Inventor: Douglas E. Raisch, c/o Raisch Products, 99 Pullman Way, San Jose, CA (US) 95106

( * ) Notice: Subject to any disclaimer, the term of this patent is extended or adjusted under 35 U.S.C. 154(b) by 116 days.

(21) Appl. No.: 09/841,810

(22) Filed: Apr. 24, 2001

(51) Int. Cl.$^7$ ............................................. C04B 18/00
(52) U.S. Cl. ..................... 106/676; 106/716; 106/814; 501/32; 501/33; 501/34; 501/155; 404/14; 404/17
(58) Field of Search ................. 106/676, 716, 106/814; 404/14, 17; 501/155, 32, 33, 34

(56) References Cited

U.S. PATENT DOCUMENTS

| | | | |
|---|---|---|---|
| 3,961,973 A | | 6/1976 | Jones |
| 4,997,485 A | * | 3/1991 | Lamoni ..................... 106/753 |
| 5,037,480 A | | 8/1991 | Baker |
| 5,512,093 A | | 4/1996 | Huege et al. |
| 5,788,407 A | | 8/1998 | Hwang |
| 5,951,199 A | * | 9/1999 | Matsushita .................. 404/17 |
| 5,988,864 A | | 11/1999 | Bracegirdle |

FOREIGN PATENT DOCUMENTS

| | | | |
|---|---|---|---|
| CN | 1232800 | * | 10/1999 |
| JP | 56092158 | * | 7/1981 |
| JP | 10053443 | * | 2/1998 |
| JP | 3055899 | * | 6/2000 |
| JP | 2000191353 | * | 7/2000 |

OTHER PUBLICATIONS

"Waste Glass as a Raw Matle for Lightweight Aggegate" Liles et al., U.S. Bureau of Mines Rep Invest. (1976), RI 8104, 8 pp, 1976.*

Road Management and Engineering Journal, "Easy Ways to Use Waste Glass as Aggregate" Aug. 10, 1997.*

*Glass as Road Aggregate*, http://www.moea.state.mn.us/lc/purchasing/glassaggregate.cfm, Minnesota Office of Environmental Assistance, St. Paul, Minnesota (*citing Specification 3138: Aggregate for Surface and Base Course*, Mar., 1999, Minnesota Department of Transportation).

*Mn/DOT Technical Meno on Glass Raod Aggregate*, http://www.swmcb.org/EPPG/App_E.HTM, revised Jan. 26, 2001, Solid Waste Mangament Coordinating Board, St. Paul, Minnesota (*reproducing Specification 3138: Aggregate for Surface and Base Course*, Technical Memorandum No. 99–08–MRR–04, Mar. 1, 1999, Minnesota Department of Transportaiton).

*Use of Glass Cullet in Roadway Construction*, http://www-.dot.state.tx.us/insdtdot/orgchart/gsd/recycle/glass.htm, updated Oct. 27, 2000 (viewed Jan. 6, 2001), Texas Department of Transportation, Austin Texas.

* cited by examiner

*Primary Examiner*—Paul Marcantoni
(74) *Attorney, Agent, or Firm*—Dorsey & Whitney LLP

(57) ABSTRACT

A method of producing an improved aggregate product from in inferior initial aggregate material base material. A percentage weight of crushed glass material is introduced into the initial aggregate material to form said aggregate product.

12 Claims, 1 Drawing Sheet

METHOD OF PRODUCING AGGREGATE PRODUCTS USING GLASS

BACKGROUND OF THE INVENTION

1. Field of the Invention

This invention relates to a new method of producing aggregate products using glass.

2. Description of Related Art

Various states have instituted regulations requiring the diversion of a certain percentage of the waste stream from landfills. For example, in 1989 the California Integrated Waste Management Board ("CIWMB") adopted Assembly Bill AB939 which required a fifty percent diversion of the waste stream from landfills by the year 2000. Cities throughout California continue to struggle to meet the AB939 requirements to avoid penalties as high as $10,000 per day if the requirements are not met.

Various entities including Raisch Products began to analyze the waste stream to determine what materials in the waste stream could be recycled, or recycled to a greater extent, and thus diverted from landfills. Waste glass proved to be one such material. Because it was known that glass has been used in the manufacture of hot asphalt, Raisch Products decided to experiment with recycled glass in forming aggregate suitable for road base use.

Various states have regulations specifying requirements for such aggregates used for road construction. For example, the State of California Department of Transportation ("CALTRANS") Class 2 aggregate is a specification generated by California's highway department used for road construction. Such material is conventionally composed of recycled asphalt and concrete. CALTRANS recently addressed the use of recycled glass by revising the Class 2 aggregate specification to include reclaimed asphalt concrete, Portland cement concrete, lean concrete base, cement treated base, glass or a combination of any of these materials.

As noted above, Raisch Products experimented with the use of recycled glass in forming aggregate suitable for road base. In particular, Raisch Products began experimenting by producing CALTRANS Class 2 aggregate using recycled glass. However, Raisch Products found that the recycled glass merely increased the cost of Class 2 aggregate production without any added any benefit other than diverting a portion of the waste stream from landfills.

Base rock which is mined from local quarries is often suitable for replacing the finer aggregate materials which are used in making lesser quality aggregates, for example, such as aggregates which conform with the City of San Jose's Class 3 aggregate requirements. Such aggregates conforming with City Class 3 requirements are a lesser quality than the aggregates which conform to the City of San Jose's Class 2 requirements and/or the State of California's CALTRANS Class 2 requirements. In fact, aggregates which conform with City Class 3 requirements often do not to meet the specifications on many State of California road construction jobs which specify the City Class 2 or the CALTRANS Class 2 requirements. In fact, it is often necessary to treat locally mined base rock with quicklime to achieve even a City Class 3 specification.

SUMMARY OF THE INVENTION

An object of the present invention is to provide a method of producing new and improved higher quality aggregate products using lower quality initial aggregate materials and crushed glass.

Another object of the present invention is to provide a method of producing aggregate products which diverts a portion of the waste stream from landfills.

Yet another object of the present invention is to provide a method of producing aggregate products using recycled glass in order to use less native materials and thus save natural resources.

A further object of the present invention is to provide a method of producing a higher quality aggregate product using an initial aggregate material that is conventionally used for producing lower quality aggregate products and using glass which is conventionally part of the waste stream which is directed into landfills.

In summary, one aspect of the present invention is directed to a method of producing an aggregate product including the steps of providing an initial aggregate material having an R-value of less than approximately 75 MIN, which does not conform with higher aggregate quality requirements, and introducing a percentage weight of crushed glass material into the initial aggregate and mixing it therewith to form the aggregate product which has an R-value greater than approximately 78 MIN.

Another aspect of the present invention is directed to a method of producing an aggregate product including the steps of providing an initial aggregate material and introducing a percentage weight of crushed glass material into the initial aggregate material to form the aggregate product. The initial aggregate material and the aggregate product conform with following aggregate grading and quality specifications:

|  | INITIAL MATERIAL | PRODUCT |
|---|---|---|
| AGGREGATE GRADING | | |
| SIEVE SIZE | % PASSING | |
| 1" | 100 | 100 |
| ¾" | 92–95 | 90–100 |
| No. 4 | 30–40 | 35–55 |
| No. 30 | 15–25 | 10–30 |
| No. 200 | 8–12 | 2–9 |
| AGGREGATE QUALITY | | |
| SAND EQUIVALENT | 20–25 MIN. | 25 MIN. |
| DURABILITY INDEX | 25–35 MIN. | 35 MIN. |
| R-VALUE | 70–75 MIN. | 78 MIN. |

The accompanying drawings, which are incorporated in and form a part of this specification, illustrate embodiments of the invention and, together with the description, serve to explain the principles of the invention.

DESCRIPTION OF THE PREFERRED EMBODIMENTS

Figure 1:
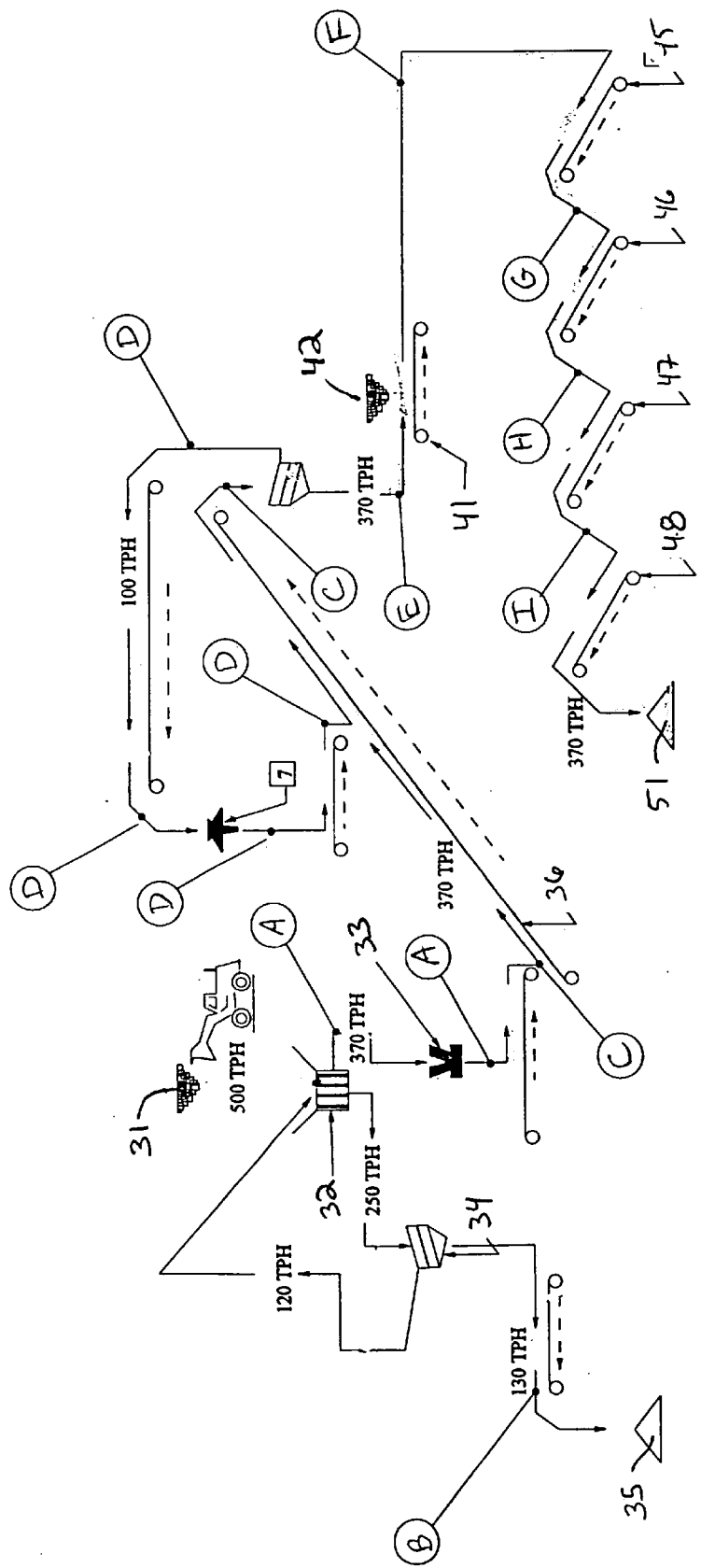
FIG. 1 is a schematic view of an aggregate recycling and crushing plant utilized to perform a method of producing an aggregate product using an initial aggregate material and glass in accordance with the present invention.

Reference will now be made in detail to the preferred embodiments of the invention, an example of which is illustrated in the accompanying drawing. While the invention will be described in conjunction with the preferred embodiments, it will be understood that the description is not intended to limit the invention to those embodiments. On the contrary, the invention is intended to cover alternatives, modifications and equivalents, which may be included within the spirit and scope of the invention as defined by the appended claims.

The present invention relates to a new and improved aggregate product. The present invention also relates to a method of producing the new and improved aggregate. The method promotes a diversion of a portion of the waste stream from landfills by using recycled glass. Because the method utilizes recycled glass to supplement native materials, the present invention promotes the conservation of natural resources by using less native materials. One method in accordance with the present invention produces higher quality aggregate products by using initial base aggregate materials which are conventionally used for producing lower quality aggregates products. For the purpose of the present invention, initial base aggregate materials are native aggregate materials which have been through a crushing and screening process but have had nothing added to the native aggregate materials.

Native base aggregate materials used in highway and fill construction are generally mined in local quarries. Often the quality of the initial materials resulting from native base aggregate materials is insufficient to conform with aggregate grading requirements and quality requirements set forth by a local municipality or state. Such requirements are generally based, in part, on requirements set by the American Society for Testing and Materials ("ASTM"). Conformance with such aggregate grading requirements and quality requirements is generally determined by testing procedures in accordance with the ASTM.

Often a local municipality or state has several levels or classes of requirements to which aggregate materials used in various construction jobs must conform. Generally, a lower class aggregate requires the use of more asphalt to provide the same load bearing capacity as a higher class aggregate. One such municipality having several classes of aggregate requirements is San Jose, Calif. For example, the City of San Jose, Calif. has multiple classes including City of San Jose Class 2 and Class 3 requirements, the aggregate grading requirements and the aggregate quality requirements thereof are as follows:

| | CITY OF SAN JOSE SPECIFICATIONS | |
|---|---|---|
| | CLASS 2 | CLASS 3 |
| AGGREGATE GRADING | | |
| SIEVE SIZE | % PASSING | |
| 1" | 100 | 100 |
| ¾" | 90–100 | 90–100 |
| #4 | 35–55 | 35–55 |
| #30 | 10–30 | 10–30 |
| #200 | 2–9 | 2–9 |
| AGGREGATE QUALITY | | |
| SAND EQUIVALENT: | 30 MIN. | 25 MIN. |
| DURABILITY INDEX: | 25 MIN. | 25 MIN. |
| R-VALUE: | 78 MIN. | 70 MIN. | in which sand equivalent refers to the relative proportion of clay-like or plastic fines and silt in granular soils and fine aggregates, durability index refers to a measure of the relative resistance of an aggregate to producing clay-sized fines when subjected to prescribed methods of interparticle abrasion in the presence of water, and R-value refers to resistance value of an aggregate, that is, the ability to sustain vertical loads when the material is wet.

Similarly, the State of California Department of Transportation, that is, CALTRANS has similar aggregate grading requirements and aggregate quality requirements, including CALTRANS Class 2, as follows:

| AGGREGATE GRADING | |
|---|---|
| SIEVE SIZE | CALTRANS SPECIFICATIONS CLASS 2 |
| 1" | 100 |
| ¾" | 90–100 |
| #4 | 35–60 |
| #30 | 10–30 |
| #200 | 2–9 |
| AGGREGATE QUALITY | |
| | CALIFORNIA SPECIFICATIONS CLASS 2 |
| SAND EQUIVALENT: | 25 MIN. |
| DURABILITY INDEX: | 35 MIN. |
| R-VALUE: | 78 MIN. |

As noted above, often the quality of an initial material, that is, a native material which has been crushed and screened but has had nothing added thereto, is insufficient to conform with aggregate grading requirements and quality requirements set forth by a local municipality or state. For example, sometimes the initial material resulting from native base aggregate material which is mined in the San Francisco Bay Area will not conform to either of the City of San Jose Class 2 or Class 3 aggregate requirements or the CALTRANS Class 2 requirements. For instance, an exemplary initial aggregate material resulting from native material mined from a quarry in Milpitas, Calif. has the following exemplary aggregate grading and aggregate quality specifications:

| | % PASSING |
|---|---|
| EXEMPLARY AGGREGATE GRADING | |
| SIEVE SIZE | |
| 1" | 100 |
| ¾" | 92–95 |
| #4 | 30–40 |
| #30 | 15–25 |
| #20 | 8–12 |
| EXEMPLARY AGGREGATE QUALITY | |
| SAND EQUIVALENT: | 20–25 |
| DURABILITY INDEX: | 25–35 |
| R-VALUE: | 70–75 |

Such initial base aggregate material is conventionally treated with quicklime in order to produce an aggregate product which conforms with one or more city or state aggregate class requirements. Adding quicklime to inferior aggregate materials causes a chemical reaction between the lime and clay which is found in the initial aggregate material. This chemical reaction results in an aggregate product which is stronger than the initial aggregate material. This conventional process is generally disclosed in U.S. Pat. No. 5,037,480 to Baker for BASE AND SUBBASE COMPOSITION.

For example, adding quicklime to inferior aggregate material, such as some initial aggregate material which is native to the San Francisco Bay Area, causes a chemical reaction between the lime and clay found in the initial base aggregate material. The chemical reaction makes the material stronger such that the resulting final aggregate material will conform to one or more class requirements.

However, this conventional method of adding quicklime to the initial base aggregate material has its limitations. In particular, adding quicklime to the initial base material often produces a final aggregate material which will conform with a lower aggregate grading requirement and a lower aggregate quality requirement but will not conform with a higher aggregate grading and quality requirements. For example, adding quicklime to the exemplary initial aggregate material having the above exemplary aggregate grading and quality specifications will result in a final aggregate material which may conform with the City of San Jose Class 3 aggregate requirements but may not conform with the City of San Jose Class 2 aggregate requirements.

The present invention is directed to a new and improved aggregate product and a method for producing the aggregate product by treating an initial aggregate material with crushed glass. The product and method of the present invention overcomes the limitations of the above conventional process in that treating an inferior initial aggregate material, which fails to conform with even lower aggregate grading and quality requirements, with crushed glass results in a superior final aggregate product which conforms with not only the lower aggregate grading and quality requirements but even with higher aggregate grading and quality requirements.

In one method of producing an aggregate product in accordance with the present invention, an initial aggregate material, such as that which is native to Milpitas, Calif., having an R-value, as determined by ASTM procedures, of approximately less than 75 MIN is provided. A percentage weight of crushed glass material, for example, greater than approximately 11%, is added to and mixed with the initial aggregate material to form a substantially uniform final aggregate product which has an R-value greater than approximately 78, as determined by ASTM procedures. More preferably, the percentage weight of crushed glass is approximately 12% to 18%, and most preferably approximately 15%.

In another method of producing an aggregate product in accordance with the present invention, an initial aggregate material having the above exemplary aggregate grading and quality specifications, as determined by ASTM procedures, is provided. A percentage weight of crushed glass material, for example, greater than approximately 11%, is added to and mixed with the initial aggregate material to form a substantially uniform final aggregate product. Again, the percentage weight of crushed glass preferably is approximately 12% to 18%, and most preferably is approximately 15%.

For example, in one embodiment of the present invention, adding a percentage weight of approximately 15% crushed glass to an initial aggregate material having the above exemplary aggregate grading and quality requirements produces a substantially uniform final aggregate product having the following specifications, as determined by ASTM testing procedures:

| PRODUCT AGGREGATE GRADING | |
|---|---|
| SIEVE SIZE | % PASSING |
| 1" | 100 |
| ¾" | 96–98 |
| #4 | 40–50 |
| #30 | 15–25 |
| #200 | 5–9 |

| -continued | |
|---|---|
| PRODUCT AGGREGATE QUALITY | |
| SAND EQUIVALENT: | 30–35 |
| DURABILITY INDEX: | 35–45 |
| R-VALUE: | 79–80 |

FIG. 1 shows a schematic view of an aggregate recycling and crushing plant utilized to perform an one method in accordance with the present invention. A native material 31 is provided which is separated into an initial aggregate material and a by-product material. The native aggregate material can be mined from a local quarry operation. For example, in one embodiment of the present invention, the initial aggregate material is separated from native material 31 which is native base rock mined from a Raisch Products quarry operation located in Milpitas, Calif. The initial aggregate material which is to be treated with glass has the above exemplary untreated aggregate grading and quality specifications. One should appreciate, however, that other initial aggregate materials native to other geographic locations may have similar aggregate grading and quality specifications and may be similarly used.

Native material 31 is loaded into a vibrating grizzly feeder 32, a machine that is primarily used for feeding large block material to the front of a crusher 33 and simultaneously removing soil and other fine materials from the path of crusher 33 in order to improve the efficiency of crusher 33. Vibrating grizzly feeder 32 improves the performance of crusher 33 by feeding only the materials that need to be crushed into crusher 33.

In one embodiment of the present invention, native material 31 is loaded into a 52 inch×20 foot vibrating grizzly feeder 32 having a bar spacing set at four inches in order to separate a initial aggregate material from a by-product material, the paths of which shown schematically as paths A and path B, respectively. The aggregate material, which has a maximum dimension over four inches, is diverted along path A and, in turn, passes through jaw crusher 33 for preliminary processing the aggregate material into a finer aggregate material having smaller dimensions. In one embodiment of the present invention, a 30 inch by 54 inch jaw crusher is used, however, one should appreciate that other suitable means can be used for preliminary processing.

Material having a maximum dimension less than four inches passes through the four inch bar spacing of grizzly feeder 32 and drops out a chute and is thus diverted to a 4 foot×12 foot two deck screen 34 which has a 1½ inch bottom deck screen. Two deck screen 34 diverts all 1½ inches×fines material, that is, finely screened material, along path B. The 1½ inches×fines material is conveyed along path B and is stock-piled as a byproduct 35.

The remaining 4 inches×1½ inches material, which is free of fines, is conveyed along a lower conveyor 36 of jaw crusher 32 and proceeds along path C to a six foot by twenty foot triple deck screen 37. The triple deck screen diverts all jaw crushed aggregate material having a maximum dimension greater than and equal to one inch along path D to a cone crusher 40. In the illustrated embodiment, cone crusher 40 is a 54 inch EL Jay Roller Cone Two, however one should appreciate that other types of crushers may be used. This process creates a closed circuit back to triple deck screen 37.

The closed circuit does not allow aggregate material to leave the crushing loop, that is, paths C and D until it is properly sized for use as an initial aggregate material for producing an aggregate product in accordance with the present invention. Once the initial aggregate material is processed to a proper size, namely having a maximum dimension equal to or less than one inch, the initial aggregate material is allowed to pass through screen 37 and proceed along path E past a ten foot by 20 ton fine materials hopper feeder 41.

As the initial aggregate material passes through fine materials hopper feeder 41, crushed glass 42 is introduced to and combined with the initial aggregate material. Optionally, the crushed glass contains recycled glass which is generally part of the waste stream. Any color glass can be used. Preferably, the crushed glass is relatively fine and has a grade similar to that of course sand. One should appreciate, however, that crushed glass having other grades can be utilized depending upon the initial materials used.

Preferably, a predetermined percent by weight of crushed glass is introduced into the processed initial aggregate material traveling through hopper 41. In one embodiment, the predetermined percentage weight is greater than approximately 11% of crushed glass material. More preferably, the percentage weight of crushed glass is approximately 12% to 18%, and most preferably approximately 15%. In the illustrated embodiment, 17% by weight of crushed glass is introduced into the initial aggregate material.

Optionally, the glass percentage is added to the initial aggregate material on a 24 inch conveyor within hopper 41. The glass percentages are metered with a variable speed frequency controller as the glass is added to the initial aggregate material. Preferably belt scales are used to meter the glass and initial aggregate material in order to determine precisely monitor the weight of each material, that is, the weight of glass and the weight of initial aggregate material mixed per hour. Periodic sampling ensures that the final aggregate product is within gradation. One should appreciate, however, that other means may be used to meter and combine the materials. The mixture of glass and initial aggregate material is conveyed along path F to four sequentially oriented receiving hoppers 45, 46, 47 and 48 which form three sequential aggregate transfer paths G, H and I in order to sufficiently mix the material into a substantially uniform mixture, thus forming a desired aggregate product 51 which conforms with not only City Class 3 aggregate requirements, but also conforms with City Class 2 requirements as well as CALTRANS Class 2 requirements.

Once the mixture is sufficiently mixed and desired aggregate product 51 is formed, aggregate product 51 is conveyed to a finish stacker and stockpiled for future use.

Although particular crushers, conveyors, screens, feeders, and hoppers were described above in connection with the method of the present invention, one should appreciate that other suitable means can be used to process native materials to an initial aggregate material in conformance with the exemplary aggregate grading and quality specifications set forth above. Furthermore, one should appreciate that base rock which is native to various locals other than those mentioned above may be used within the scope of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of producing an aggregate product comprising the steps of:
    providing an aggregate material having an R-value of less than approximately 75 MIN; and
    introducing a percentage weight greater than approximately 11% of crushed glass material into said aggregate material to form said aggregate product;
    said aggregate product having an R-value greater than approximately 78 MJN.

2. The method of claim 1 wherein said introducing step is accomplished by introducing a percentage weight of approximately 11% to 20% crushed glass material into said aggregate material to form said aggregate product.

3. The method of claim 1 wherein said introducing step is accomplished by introducing a percentage weight of approximately 12% to 18% crushed glass material into said aggregate material to form said aggregate product.

4. The method of claim 1 wherein said introducing step is accomplished by introducing a percentage weight of approximately 15% crushed glass material into said aggregate material to form said aggregate product.

5. A method of producing an aggregate product comprising the steps of:
    providing an aggregate material; and
    introducing a percentage weight greater than approximately 11% of crushed glass material into said aggregate material to form said aggregate product;
    said aggregate material and said aggregate product conforming with following grading and quality specifications:

|  | MATERIAL | PRODUCT |
|---|---|---|
| AGGREGATE GRADING | | |
| SIEVE SIZE | % PASSING | |
| 1" | 100 | 100 |
| ¾" | 92–95 | 90–100 |
| No. 4 | 30–40 | 35–55 |
| No. 30 | 15–25 | 10–30 |
| No. 200 | 8–12 | 2–9 |
| AGGREGATE QUALITY | | |
| SAND EQUIVALENT | 20–25 MIN. | 25 MIN. |
| DURABILITY INDEX | 25–35 MIN. | 35 MIN. |
| R-VALUE | 70–75 MIN. | 78 MIN. |

6. The method of claim 5 wherein said introducing step is accomplished by introducing a percentage weight greater than approximately 11% crushed glass material into said aggregate material to form said aggregate product.

7. The method of claim 5 wherein said introducing step is accomplished by introducing a percentage weight of approximately 11% to 20% crushed glass material into said aggregate material to form said aggregate product.

8. The method of claim 5 wherein said introducing step is accomplished by introducing a percentage weight of approximately 12% to 18% crushed glass material into said aggregate material to form said aggregate product.

9. The method of claim 5 wherein said introducing step is accomplished by introducing a percentage weight of approximately 15% crushed glass material into said aggregate material to form said aggregate product.

10. A method of producing an aggregate product having an R-value greater than 78, said method comprising the steps of:

providing an aggregate material formed of base rock;

determining said aggregate material has an R-value of less than 75;

providing crushed glass having the consistency of coarse sand; and introducing a percentage weight greater than approximately 11% of said crushed glass into and combined with said aggregate material to form said aggregate product.

11. The method of claim 10 wherein said aggregate material is conveyed along a conveyor and said percentage weight of crushed glass is metered with a variable speed frequency controller as said crushed glass is added to said aggregate material.

12. The method of claim 11 wherein belt scales are utilized to meter the weight of said crushed glass and said aggregate material to control the introduction of said percentage weight of crushed glass into said aggregate material.

* * * * *

UNITED STATES PATENT AND TRADEMARK OFFICE
CERTIFICATE OF CORRECTION

PATENT NO.    : 6,695,908 B1
DATED         : February 24, 2004
INVENTOR(S)   : Douglas E. Raisch It is certified that error appears in the above-identified patent and that said Letters Patent is hereby corrected as shown below:

<u>Column 8,</u>
Line 13, change "78 MJN" to -- 78 MIN --

Signed and Sealed this

Fifteenth Day of June, 2004

JON W. DUDAS
*Acting Director of the United States Patent and Trademark Office*